United States Patent
Lee et al.

(10) Patent No.: US 8,251,628 B2
(45) Date of Patent: Aug. 28, 2012

(54) JOINT TONG APPARATUS FOR RADIATION SHIELDING FACILITY

(75) Inventors: Eun Pyo Lee, Daejeon (KR); Won Myung Choung, Daejeon (KR); Dong Hee Hong, Daejeon (KR); Jeong Hoe Ku, Daejeon (KR); Won Kyung Lee, Daejeon (KR); Il Je Cho, Daejeon (KR); Dong Hak Kook, Daejeon (KR); Kie Chan Kwon, Daejeon (KR); Gil Sung You, Daejeon (KR); Ji Sup Yoon, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 974 days.

(21) Appl. No.: 12/259,445

(22) Filed: Oct. 28, 2008

(65) Prior Publication Data
US 2009/0116606 A1 May 7, 2009

(30) Foreign Application Priority Data
Nov. 2, 2007 (KR) .................. 10-2007-0111468

(51) Int. Cl.
*B25J 1/00* (2006.01)
*G21F 7/06* (2006.01)
*B65B 21/02* (2006.01)
*B23P 19/00* (2006.01)

(52) U.S. Cl. .............. 414/7; 414/8; 414/416.01; 29/723
(58) Field of Classification Search .................. None
See application file for complete search history.

(56) References Cited

U.S. PATENT DOCUMENTS
3,212,651 A * 10/1965 Specht et al. ............... 414/7
* cited by examiner Primary Examiner — Erin M Leach
(74) Attorney, Agent, or Firm — Bachman & LaPointe, P.C.

(57) ABSTRACT

A joint tong apparatus for a radiation shielding facility. A spherical ball has a through-hole. An inner spherical socket and an outer spherical socket are installed in a hole formed in a partition between a radiation-shielded room and a control room so as to enclose the spherical ball on inner and outer sides. A bar is inserted and coupled into and to the through-hole of the spherical ball. An inner joint assembly has a first housing coupled to a shielded room-side end of the bar and a first pivot member pivotably mounted on a free end of the first housing. An outer joint assembly having a second housing coupled to a control room-side end of the bar and a second pivot member pivotably mounted on a free end of the second housing. The apparatus further includes a tong assembly, a handle assembly, a tong manipulation cable, and a pair of pivot manipulation cables.

14 Claims, 12 Drawing Sheets

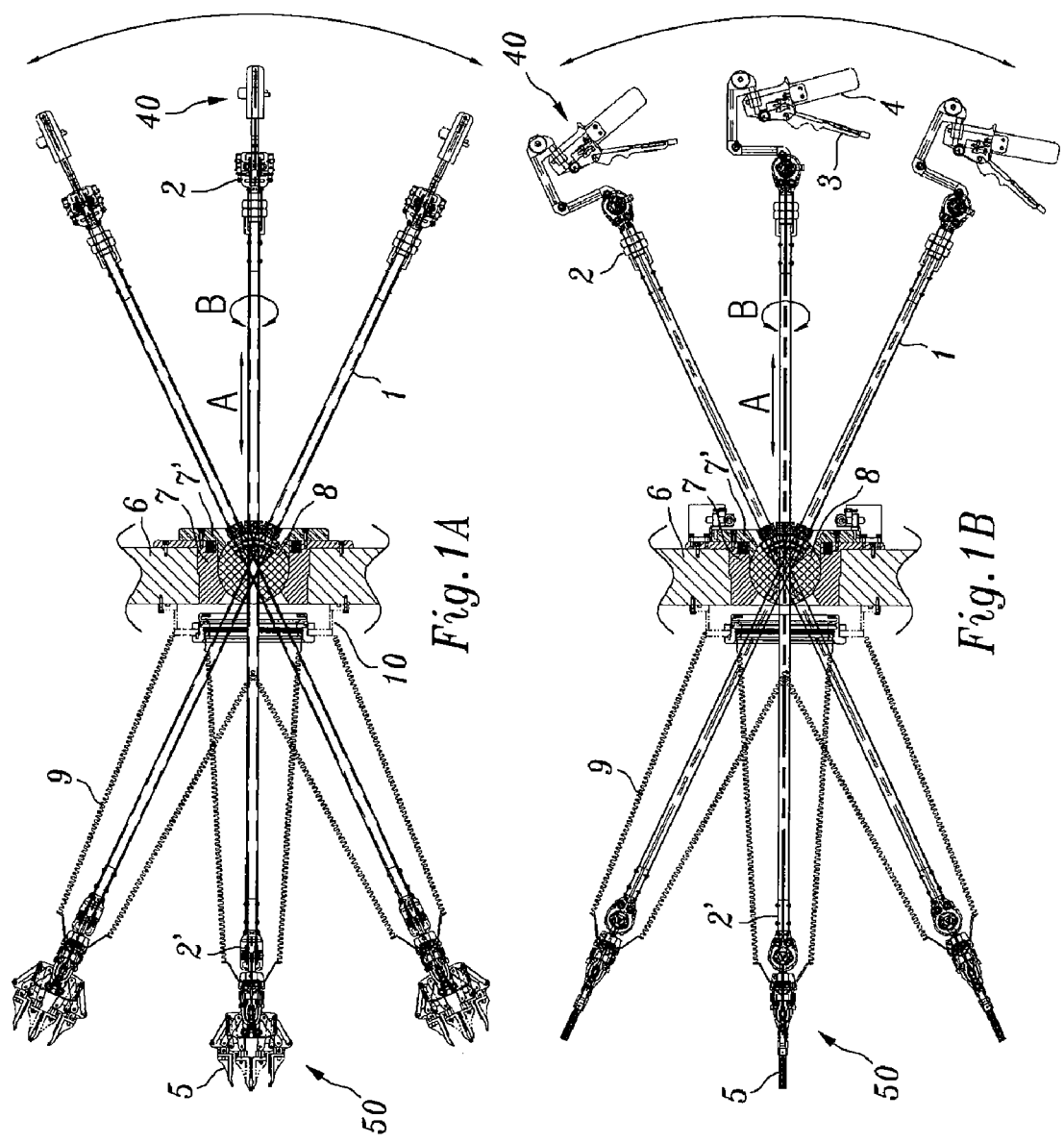

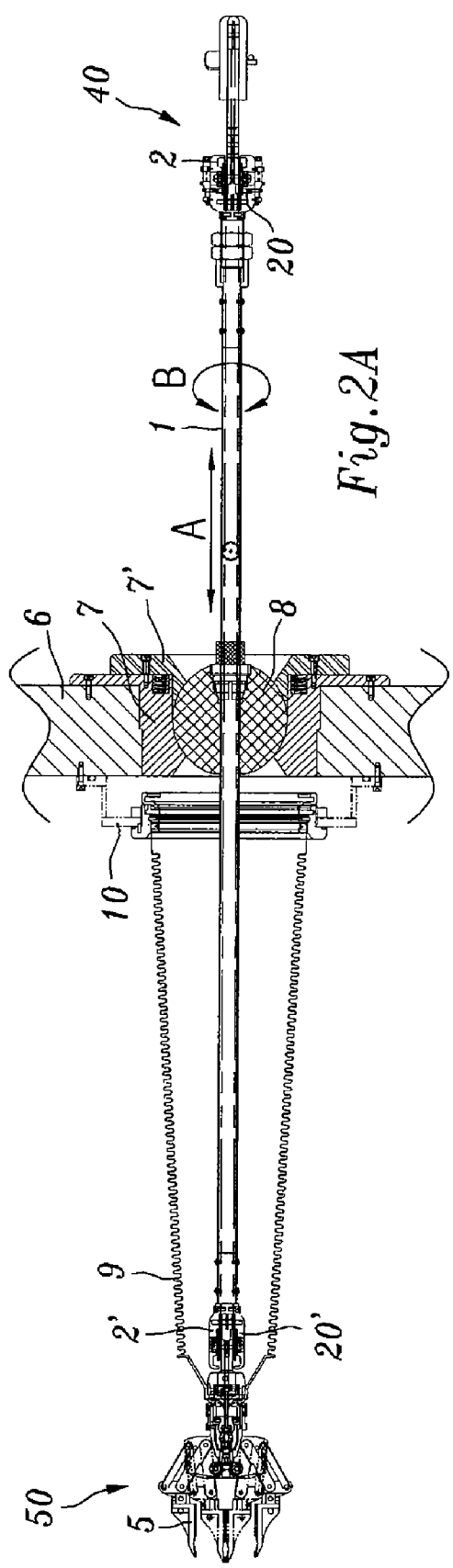
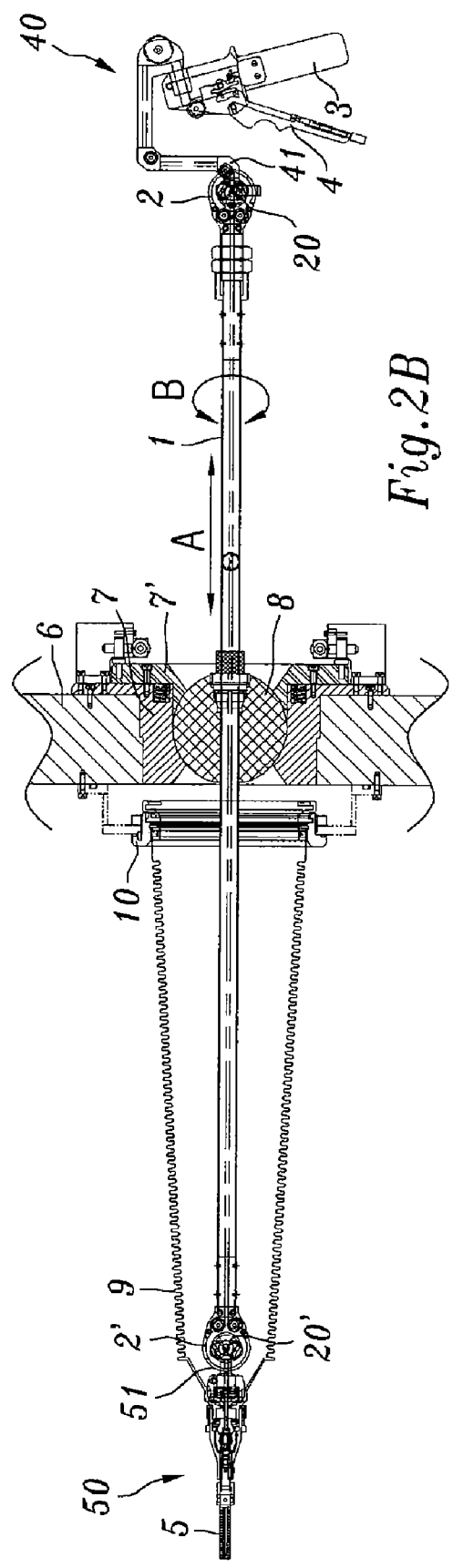

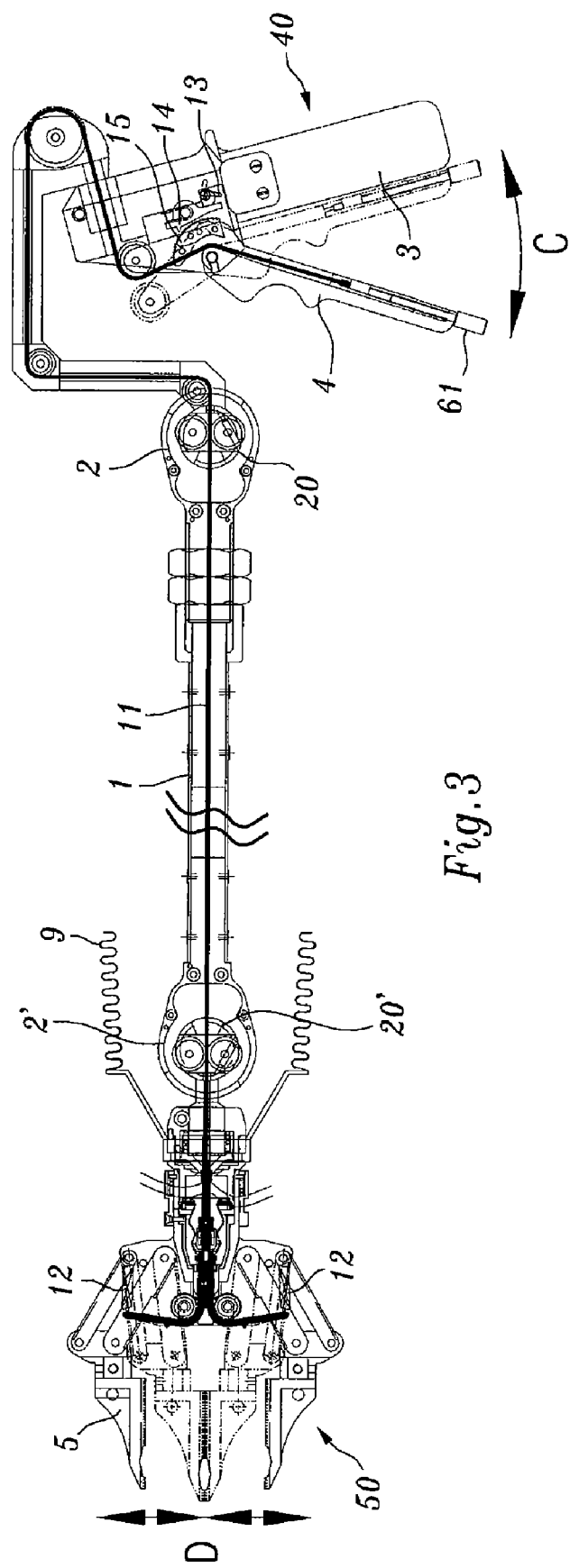

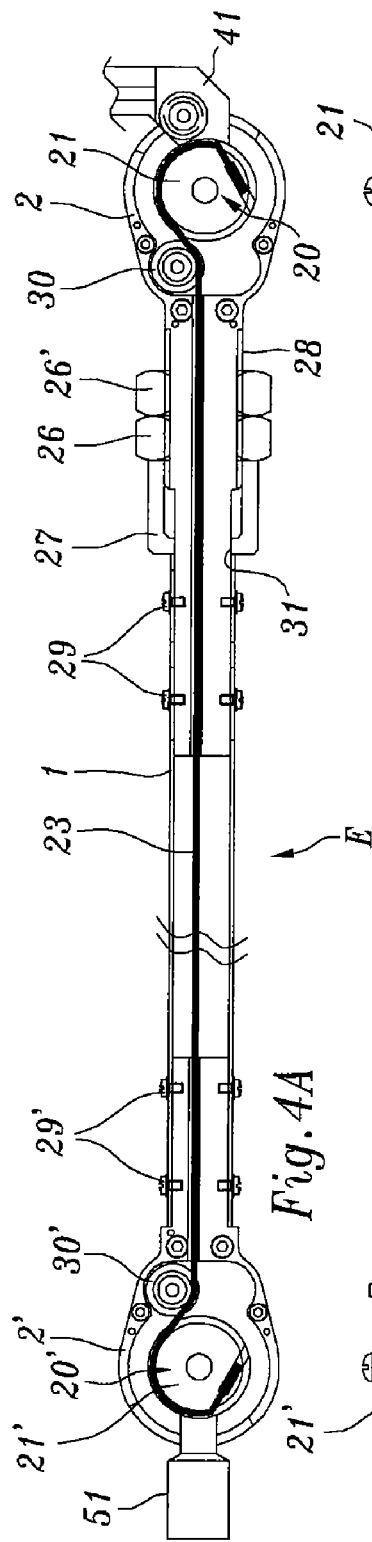
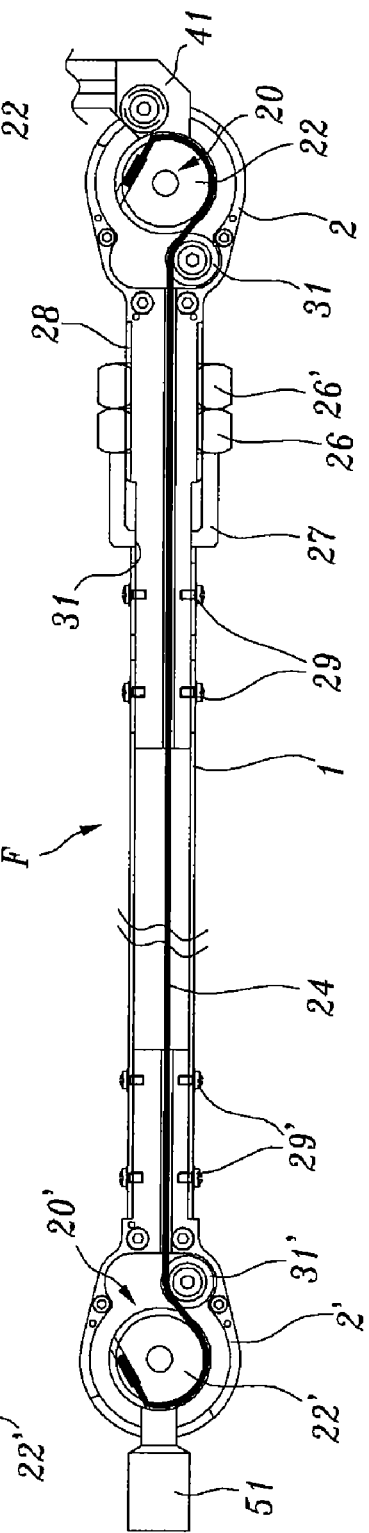
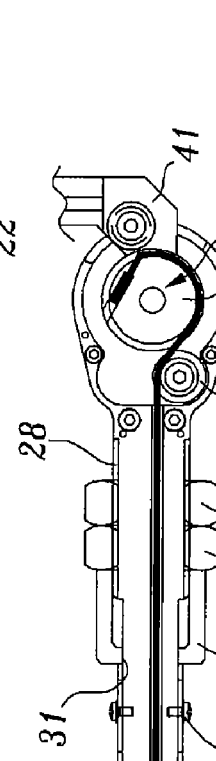

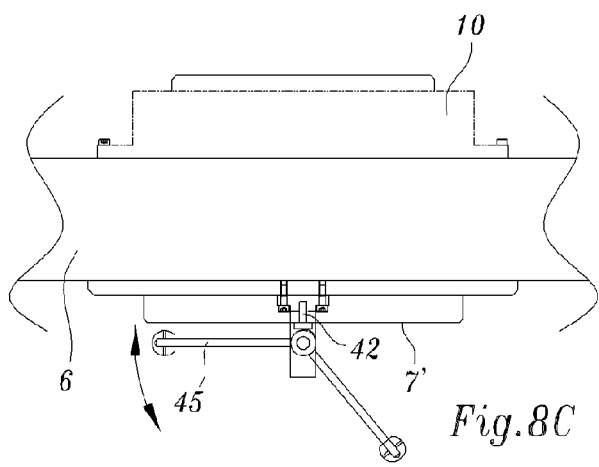
Fig.8C
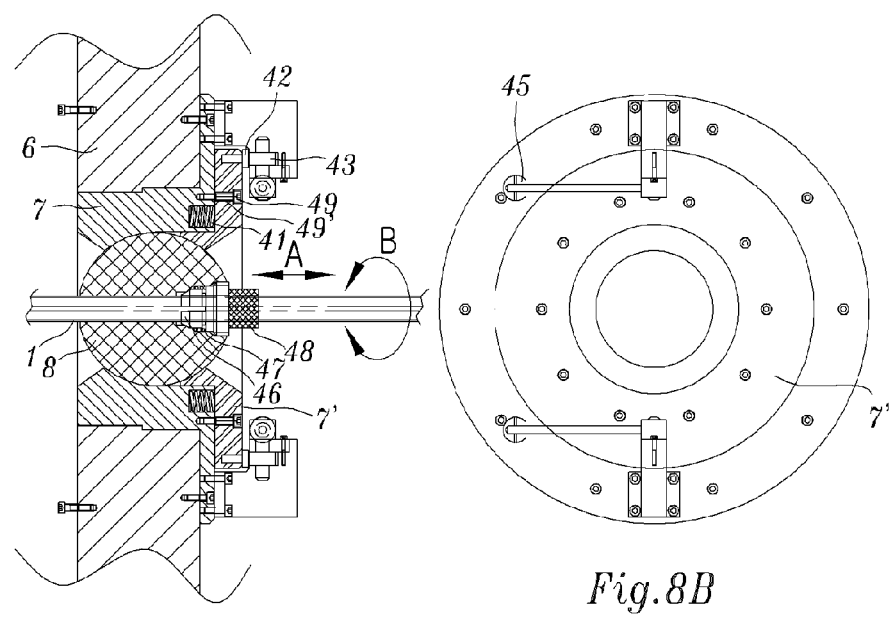
Fig.8A
Fig.8B

JOINT TONG APPARATUS FOR RADIATION SHIELDING FACILITY

BACKGROUND OF THE INVENTION

1. Field of the Invention

The present invention relates, in general, to a tong apparatus for a radiation shielding facility and, more particularly, to a joint tong apparatus for a radiation shielding facility in which a bar having a predetermined length is provided with a handle and a tong, each of which functions as a joint, at opposite ends thereof, thereby allowing the at-will handling of radioactive material being moved to a desired position and state in the radiation shielding facility.

2. Description of the Related Art

Generally, there is in danger of radiation exposure when radioactive material, or when a vessel, bottle or the like in which the radioactive material is contained, is moved to a desired position and state in the facilities in which highly radioactive nuclear material is handled.

In order to move the radioactive material, or the vessel, bottle or the like in which the radioactive material is contained, to a desired position and state which is out of the danger zone of this radiation exposure, various apparatuses that can be controlled remotely are used in the radiation shielding facilities.

Meanwhile, the shielding facilities where the radioactive material is handled should be equipped with isolated facilities in order to shield radiation, and be essentially equipped with a remote control apparatus such as a joint tong apparatus that enables remote handling (as mentioned above) in order to handle the radioactive material in the shielding facilities.

A conventional joint tong apparatus installed in the radiation shielding facilities in order to handle the radioactive material, or the vessel, bottle or the like in which the radioactive material is contained, is installed in a hole formed in the wall (or partition) of the radiation shielding facilities, and includes a spherical member having a through-hole passing therethrough, and a pair of spherical shells located in the hole together with the spherical member so as to enclose the spherical member on diametrically opposite sides of the spherical member. Thus, the spherical member can freely carry out rotational motion in the pair of spherical shells.

The conventional joint tong apparatus further includes a long bar that is inserted and coupled into and to the through-hole of the spherical member and which can make longitudinal motion and rotational motion with respect to the spherical member, a handle and a tong mounted on respective opposite ends of the bar, and steel wires connecting the handle with the tong and manipulating the tong while passing through the inside of the bar. Thus, the radioactive material, or the vessel, bottle or the like in which the radioactive material is contained, can be handled at a remote position.

However, this conventional joint tong apparatus not only has a great difficulty in handling the radioactive material, or the vessel, bottle or the like in which the radioactive material is contained, in arbitrary directions and states because the handle and tong mounted on respective opposite ends of the bar are in a stationary state, but also makes it impossible to stop all motion of the radioactive material, or the vessel, bottle or the like in which the radioactive material is contained, at arbitrary positions and states during handling because it is not equipped with a locking apparatus for controlling the operation of the handle and tong, namely fixing the positions of the handle and tong.

Particularly, since the handle and tong are fixedly mounted on opposite ends of the bar, the radioactive material in a liquid state may leak out while the bar makes forward/backward and rotational motions with respect to the spherical member when being handled, which leads to a serious problem.

SUMMARY OF THE INVENTION

Accordingly, the present invention has been made keeping in mind the above problems occurring in the related art, and embodiments of the present invention provide a joint tong apparatus for a radiation shielding facility, which is installed in the radiation shielding facility, which can not only handle radioactive material, or a vessel, bottle or the like in which the radioactive material is contained, in arbitrary directions and states in a free and convenient manner but also can control the radioactive material, or the vessel, bottle or the like in which the radioactive material is contained, to be stopped at an arbitrary position and in an arbitrary state during handling, and which allows the radioactive material in a liquid state to be stably controlled in the state in which there is a minimized danger of leakage of the liquid radioactive material when the liquid radioactive material is being handled.

According to one aspect of the present invention, there is provided a joint tong apparatus for a radiation shielding facility, which comprises: a spherical ball having a through-hole passing therethrough; a spherical socket set having an inner spherical socket and an outer spherical socket, which are formed so as to correspond to an outer surface of the spherical ball, and are installed in a hole formed in a partition between a radiation-shielded room and a control room so as to enclose the spherical ball on inner and outer sides; a bar inserted and coupled into and to the through-hole of the spherical ball, and including three cable through-holes passing through an inside thereof in parallel in a longitudinal direction; an inner joint assembly having a first housing coupled to a first end of the bar on the side of the shielded room and a first pivot member mounted on a free end of the first housing so as to be able to be pivoted within a predetermined angle; an outer joint assembly having a second housing coupled to a second end of the bar on the side of the control room and a second pivot member mounted on a free end of the second housing so as to be able to be pivoted within a predetermined angle; a tong assembly including a tong for grasping an object and a restoring spring keeping the tong open at ordinary times, and coupled to the inner joint assembly through the first pivot member; a handle assembly including a handle and a handle lever, and coupled to the outer joint assembly through the second pivot member; a tong manipulation cable connected to the tong at a first end thereof on the side of the shielded room, and sequentially passing through the inner joint assembly, bar, and outer joint assembly, connected to the handle lever at a second end thereof on the side of the control room, and closing the tong when the handle lever is manipulated; and a pair of pivot manipulation cables fixed by winding to the first pivot member at first ends thereof on the side of the shielded room, sequentially passing through the first housing, bar, and second housing, fixed by winding to the second pivot member at second ends thereof on the side of the control room, wound around the first and second pivot members in different directions, and enabling the tong assembly to be pivoted in opposite directions by means of manipulation of the handle assembly.

In an embodiment of the present invention, the inner spherical socket and the outer spherical socket may be coupled with each other by guide bolts, and be spaced apart from each other by a constant distance at normal times by means of restoring springs that are installed between the inner spherical socket and the outer spherical socket so as to push the outer spherical socket against the inner spherical socket.

In another embodiment of the present invention, the joint tong apparatus may further comprise a spherical ball locking means, which includes cam members selectively pressing the outer spherical socket toward the inner spherical socket during rotation, cam manipulation levers integrated with the cam members, and cam supports coupled to a top of the outer spherical socket contacting the cam members, wherein the spherical ball locking means may constrain rotational motion of the spherical ball in such a manner that the outer spherical socket comes into close contact with the inner spherical socket.

In another embodiment of the present invention, the joint tong apparatus may further comprise: a bar locking means holder, which is installed in the through-hole of the spherical ball and includes a threaded bolt holder, a spring holder, and a collet guide, diameters of which are step by step reduced starting from a control room-side entrance of the through-hole of the spherical ball, the collet guide having a diameter gradually reduced in part; and a bar locking means, which includes: a collet having a taper part, a diameter of which is elastically varied within a predetermined range, on an inner side thereof, and a spring presser having a relatively greater diameter on an outer side thereof; a restoring spring which is disposed between an outer circumference of the taper part of the collet and the spring holder and which is in contact with the spring presser of the collet at an outer end thereof; and a hollow adjusting bolt threaded on an outer circumference thereof and engaged with the bolt holder, wherein the bar locking means may limit longitudinal and rotational motions of the bar with respect to the spherical ball in such a manner that, while the adjusting bolt is screwed to advance the collet in an inward direction, the diameter of the taper part is reduced to have the collet guide press the outer circumference of the bar.

In another embodiment of the present invention, the joint tong apparatus may further comprise a tong locking means, which includes: a ratchet integrally coupled to the handle lever and having a ratchet wheel with a plurality of teeth; a pawl mounted on the handle through a hinge so as to be located adjacent to the ratchet, and having a constraint protrusion engaged with the ratchet wheel of the ratchet; and a ratchet manipulation lever having a cam part and a lever part, mounted on the handle so as to be located adjacent to the pawl, and allowing the ratchet to be constrained by the pawl or to be released from the constraint caused by the pawl in such a manner that the pawl is pivoted around the hinge when the cam part thereof partially presses the pawl by means of manipulation of the lever part thereof.

In another embodiment of the present invention, the constraint protrusion of the pawl and the ratchet wheel of the ratchet may be shaped so as to limit only pivotal motion in a direction where the handle lever is restored.

In another embodiment of the present invention, the joint tong apparatus may further comprise an adjustment knob, which is mounted on a lower end of the handle lever and adjusts a length of the tong manipulation cable.

In another embodiment of the present invention, the first pivot member may include a first connecting rod protruding from a center thereof in a radial direction and coupled with the tong assembly, and a pair of first cable drums which are integrally coupled to opposite sides of the first connecting rod and to which shielded room-side ends of the pivot manipulation cables are fixed by winding, and the second pivot member may include a second connecting rod protruding from a center thereof in a radial direction and coupled with the handle assembly, and a pair of second cable drums which are integrally coupled to opposite sides of the second connecting rod and to which control room-side ends of the pivot manipulation cables are fixed by winding.

In another embodiment of the present invention, the joint tong apparatus may further comprise a tong assembly pivotal motion locking means, which includes: a pair of stoppers having guide rollers mounted on outer ends thereof, housed together with compressive springs in a pair of stopper guide holes passing through opposite sides of the second housing at positions where the stoppers face the sides of the respective cable drums parallel to a pivotal axis of the second pivot member, and constraining the second pivot member from being pivoted in such a manner that the stoppers laterally press the cable drums through inner ends thereof facing the sides of the cable drums using elastic force of the compressive springs; a pair of linear motion cams mounted on the respective opposite sides of the second housing, moving back and forth within a predetermined range, having inclined faces on which the guide rollers of the stoppers are guided when the linear motion cams are moving back and forth, and serving to push or pull the stoppers configured to press or release the sides of the cable drums; and a cam lever integrally formed with the linear motion cams such that the linear motion cams are manipulated in forward and backward directions at the same time.

In another embodiment of the present invention, the stoppers may each include a plurality of constraint protrusions on the inner ends thereof facing the sides of the cable drum, and the cable drums of the second pivot member may each include a plurality of constraint grooves on sides thereof contacting the constraint protrusions of the respective stoppers so as to be engaged with the constraint protrusions of the respective stoppers and provide stable constraining force when pressed by the stoppers.

In another embodiment of the present invention, the first and second housings may each include a pair of idle sheaves mounted therein and guiding paths of the pivot manipulation cables such that the pivot manipulation cables do not interfere with other components.

In another embodiment of the present invention, the first and second housings may have fixing ends connected with the first and second ends of the bar on the sides of the shielded and control rooms, and be coupled with the opposite ends of the bar in such a manner that the fixing ends thereof overlap with each other at a predetermined length inside the opposite ends of the bar. The overlapping lengths between the fixing ends of the first and second housings and the opposite ends of the bar may be varied within a limited range in order to adjust the tensile force of the housed pivot manipulation cables. The first and second housings may be fastened from an outer circumference toward a center of the bar by means of at least one fastening bolt in order to maintain the connection with the bar.

In another embodiment of the present invention, the second housing may include an intermediate part between the fixing end and the free end thereof, the intermediate part having a large diameter and a threaded outer circumference, and the joint tong apparatus may further comprise: a support member, which has the shape of a cylinder having an inner diameter corresponding to an outer diameter of the intermediate part of the second housing, and which includes a through-hole having an inner diameter corresponding to an outer diameter of the fixing end of the second housing at a first end thereof facing an end face of the bar 1 on the side of the shielded room, encloses the outer circumference of the second housing and is disposed such that the first end thereof located on the side of the shielded room is in contact with the end face of the bar located on the side of the control room; and a tension adjusting nut screwed with the thread formed on the intermediate part of the second housing, causing the second housing to be relatively pulled from the bar when screwed toward the shielded room in contact with the end face of the support member on the side of the control room, and adjusting tensile force of the pivot manipulation cables.

In another embodiment of the present invention, the joint tong apparatus may further comprise an anti-loosening nut, which is screwed with the thread formed on the intermediate part of the second housing so as to be engaged with the tension adjusting nut, and which prevents the tension adjusting nut from being loosened when screwed so as to remain in close contact with the tension adjusting nut.

In another embodiment of the present invention, the joint tong apparatus may further comprise a boot assembly, which includes an anti-contamination boot, one end of which is airtightly fixed to an outer circumference of a part where the tong assembly is connected with the first connecting rod of the first pivot member, and a boot fixing plate, which is mounted on a shielded room-side wall of the partition formed between the radiation-shielded room and the control room such that the other end of the anti-contamination boot is airtightly fixed.

As described above, the joint tong apparatus for a radiation shielding facility can carry out various motions such as rotational motion of the spherical ball, longitudinal and rotational motions of the bar, pivotal motion of the tong assembly, opening/closing motion of the tong, and furthermore each motion can be individually limited when required. Further, the joint tong apparatus can not only handle radioactive material, or a vessel, bottle or the like in which the radioactive material is contained, in arbitrary directions and states in a free and convenient manner, but also can control the radioactive material, or the vessel, bottle or the like in which the radioactive material is contained, to be stopped at an arbitrary position and in an arbitrary state during handling, and can control the radioactive material having a liquid state in the state in which the danger of leakage of the liquid radioactive material is minimized even when the liquid radioactive material is being handled, so that the joint tong apparatus can remarkably improve stability and convenience.

BRIEF DESCRIPTION OF THE DRAWINGS

The above and other objects, features and advantages of the present invention will be more clearly understood from the following detailed description when taken in conjunction with the accompanying drawings, in which:

FIG. 1 is a partial cutaway view explaining the rotational motion of a joint tong apparatus for a radiation shielding facility according to an embodiment of the present invention, wherein FIG. 1A is a top plan view, and FIG. 1B is a side view;

FIG. 2 is a partial cutaway view illustrating a joint tong apparatus for a radiation shielding facility according to an embodiment of the present invention, wherein FIG. 2A is a top plan view, and FIG. 2B is a side view;

FIG. 3 is a conceptual view explaining the operation of a tong caused by the manipulation of a handle lever;

FIGS. 4A through 4D are side views and top plan views conceptually illustrating connection of pivot manipulation cables for transmitting pivotal motion of a handle to pivotal motion of a tong;

FIG. 8 conceptually illustrates the locking structure of a spherical ball and the locking structure of a bar passing through the spherical ball, wherein FIG. 8A is a side sectional view, FIG. 8B is a front view, and FIG. 8C is a top plan view;

FIG. 9 conceptually illustrates the locking structure of a bar, wherein

DETAILED DESCRIPTION OF THE INVENTION

Figure 5A:
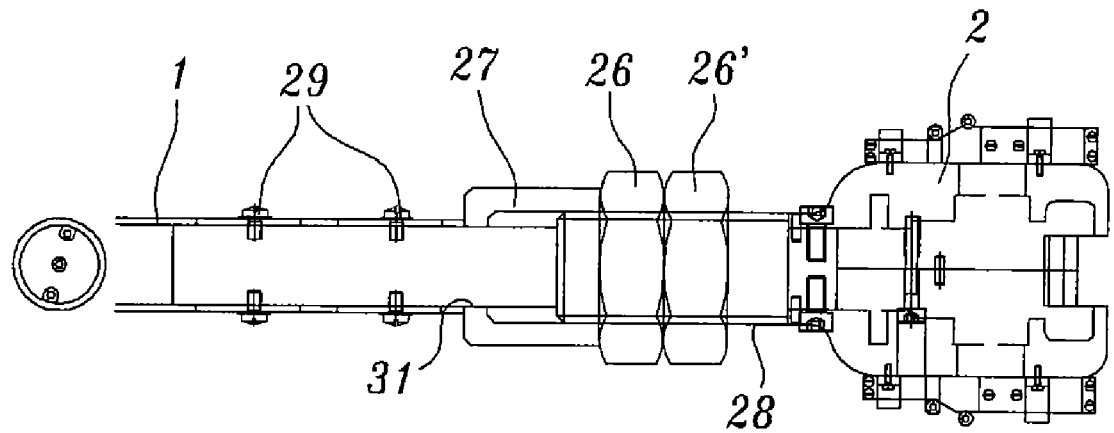
FIGS. 5A and 5B are a top plan view and a side view partially illustrating a second housing constituting an outer joint assembly.

Reference will now be made in greater detail to an exemplary embodiment of the invention, an example of which is illustrated in the accompanying drawings. Wherever possible, the same reference numerals will be used throughout the drawings and the description to refer to the same or like parts.

For reference, it should be noted that the terms "inner (side)" and "outer (side)," as used throughout the specification, refer to "the side of the shielded room" or "shielded room-side" and "the side of the control room" or "control room-side" on the basis of the shielded room and the control room divided by the partition as long as they are not otherwise explicitly defined.

As illustrated in FIGS. 1 through 3, according to an embodiment of the present invention, a joint tong apparatus for a radiation shielding facility includes a spherical ball 8, a spherical socket set retaining the spherical ball 8 so as to ensure free rotational motion of the spherical ball 8, and a long bar 1 passing through the spherical ball 8.

In detail, the spherical ball 8 has a through-hole 8a (see FIG. 8A) formed in a diametrical direction so as to allow the bar 1 to pass through the spherical ball 8.

The spherical socket set includes an inner spherical socket 7 and an outer spherical socket 7', which are formed so as to correspond to an outer surface of the spherical ball 8, and are installed in a hole formed in a partition 6 between a radiation-shielded room (or a hot cell) and a control room so as to enclose the spherical ball 8 on inner and outer sides, i.e. on the sides of the shielded and control rooms.

Further, the bar 1 is inserted and coupled into and to the through-hole 8a of the spherical ball 8, is shaped like a long pipe, and has built-in shielding. The bar 1 includes three cable through-holes, which pass through the shielding in parallel in a longitudinal direction and into which a tong manipulation cable 11 (see FIG. 3) and a pair of pivot manipulation cables 23 and 24 (see FIG. 4) can be inserted, and cylindrical spaces having a predetermined length in opposite ends thereof. Among the three cable through-holes, a first one is for the tong manipulation cable 11 and passes through the center of the bar 1, and the second ones are for the pivot manipulation cables 23 and 24 and are arranged in parallel around the first cable through-hole passing through the center of the bar 1.

Meanwhile, the through-hole 8a of the spherical ball 8 has an inner diameter that is slightly greater than an outer diameter of the bar 1, so that the bar 1 can not only move in the through-hole 8a of the spherical ball 8 in a longitudinal direction but also be rotated around a central axis of the through-hole 8a of the spherical ball 8. However, if the inner diameter of the through-hole 8a of the spherical ball 8 is excessively greater than the outer diameter of the bar 1, a gap between an inner circumference of the through-hole 8a of the spherical ball 8 and an outer circumference of the bar 1 is increased, so that the longitudinal linear motion of the bar 1 in the spherical ball 8 is not made smooth. Thus, the inner diameter of the through-hole 8a of the spherical ball 8 is preferably formed as small as possible so long as the longitudinal linear motion of the bar 1 is made smooth.

The spherical ball 8 is rotatably constrained between the inner spherical socket 7 and the outer spherical socket 7' constituting the spherical socket set. In order to guarantee the smooth rotational motion of the spherical ball 8, the inner spherical socket 7 and the outer spherical socket 7' are arranged so as not to be in close contact with each other, namely so as to be spaced apart from each other by a predetermined distance. To this end, the inner spherical socket 7 and the outer spherical socket 7' are coupled with each other by guide bolts 49, but the guide bolts 49 are not fastened so as to bring the outer spherical socket 7' into close contact with the inner spherical socket 7. Further, restoring springs 41 are installed between the inner spherical socket 7 and the outer spherical socket 7' so as to push the outer spherical socket 7' against the inner spherical socket 7, so that the inner spherical socket 7 and the outer spherical socket 7' can be spaced apart from each other by a constant distance. Thus, the spherical ball 8 can make free rotational motion while being enclosed by the outer spherical socket 7' and the inner spherical socket 7.

As illustrated in FIGS. 4 through 7, according to an embodiment of the present invention, the joint tong apparatus for a radiation shielding facility includes an inner joint assembly coupled to a first end of the bar 1 on the side of the shielded room so as to allow a tong assembly, which will be described below, to be pivoted within a predetermined angle, and an outer joint assembly coupled to the second end of the bar 1 on the side of the control room so as to allow a handle assembly, which will be described below, to be pivoted within a predetermined angle.

In detail, the inner joint assembly includes a first housing 2', a fixing end of which is coupled to the first end of the bar 1 on the side of the shielded room, and a first pivot member 20' mounted on a free end of the first housing 2' so as to be able to be pivoted within a predetermined angle. Further, the outer joint assembly includes a second housing 2, a fixing end of which is coupled to the second end of the bar 1 on the side of the control room, and a second pivot member 20 mounted on a free end of the second housing 2 so as to be able to be pivoted within a predetermined angle.

More specifically, the first pivot member 20' is rotatably mounted in an inner space of the free end of the first housing 2' by first bearings 57 (see FIG. 12), and includes a first connecting rod 51 protruding from the center thereof in a radial direction and coupled with the tong assembly 50, and a pair of first cable drums 21' and 22' which are integrally coupled to opposite sides of the first connecting rod 51. Similarly, the second pivot member 20 is rotatably mounted in an inner space of the free end of the second housing 2 through second bearings 57 (see FIG. 12), and includes a second connecting rod 41 protruding from the center thereof in a radial direction and coupled with the handle assembly 40, and a pair of second cable drums 21 and 22 which are integrally coupled to opposite sides of the second connecting rod 41.

According to an embodiment of the present invention, the joint tong apparatus has the tong assembly 50, which includes a tong 5 grasping an object and a restoring spring 12 keeping the tong 5 open at ordinary times, and which is coupled to the inner joint assembly through the first connecting rod 51 of the first pivot member 50.

Furthermore, as illustrated in FIG. 3, the joint tong apparatus also has the handle assembly 40, which includes a handle 3 and a handle lever 4 and which is coupled to the outer joint assembly through the second connecting rod 41 of the second pivot member 40.

Figures 14A, 14B:
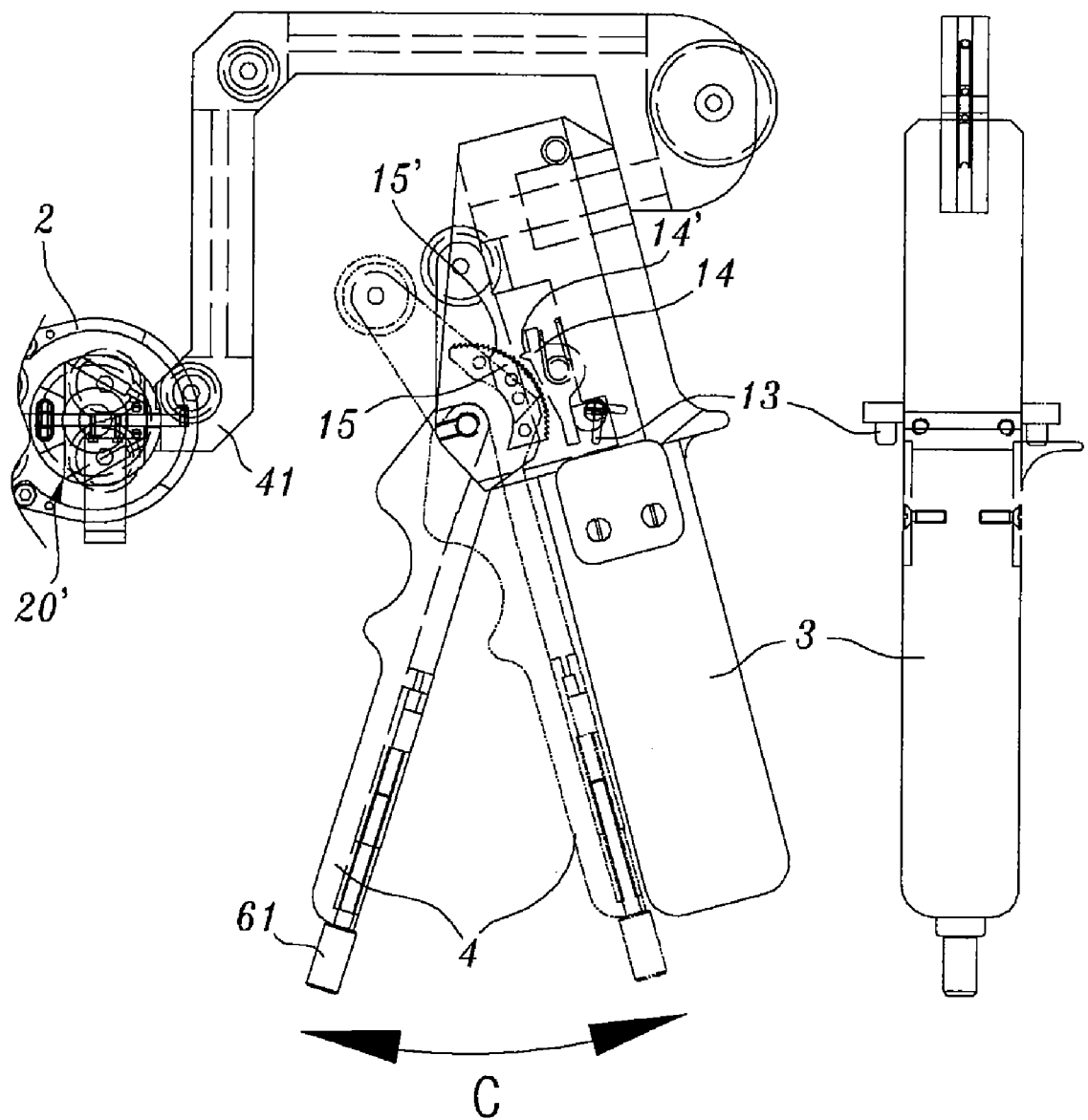
FIG. 14 conceptually illustrates the structure of a tong locking means mounted on a handle assembly.

In detail, the handle lever 4 is coupled with the handle 3 through a hinge, and thus can be relatively pivoted around the hinge (in the direction of the arrow C of FIGS. 3 and 14). The handle lever 4 has a lower end thereof to which one end of the tong manipulation cable 11 is fixed. Further, the handle lever 4 is coupled with an adjustment knob 61 (see FIG. 3), which adjusts a length of the tong manipulation cable 11 so as to have an appropriate tensile force. Alternatively, the handle lever 4 may further include an elastic member (not shown) so as to be always kept open with respect to the handle 3.

Meanwhile, according to an embodiment of the present invention, the joint tong apparatus has the tong manipulation cable 11 closing the tong by means of manipulation of the handle lever 4, and the pair of pivot manipulation cables 23 and 24 allowing the tong assembly 50 to be pivoted in opposite directions by manipulation of the handle assembly 40.

In detail, the tong manipulation cable 11 is connected to the tong 5 at the first end thereof on the side of the shielded room, and sequentially passes through the first connecting rod 51 and first housing 2' of the inner joint assembly, and the second housing 2 and the second connecting rod 41 of the outer joint assembly. Further, the tong manipulation cable 11 is connected to the handle lever 4 at the second end thereof on the side of the control room, and causes the tong 5 to be closed when the handle lever 4 is pulled toward the handle 3 so as to be pivoted.

Figure 5B:
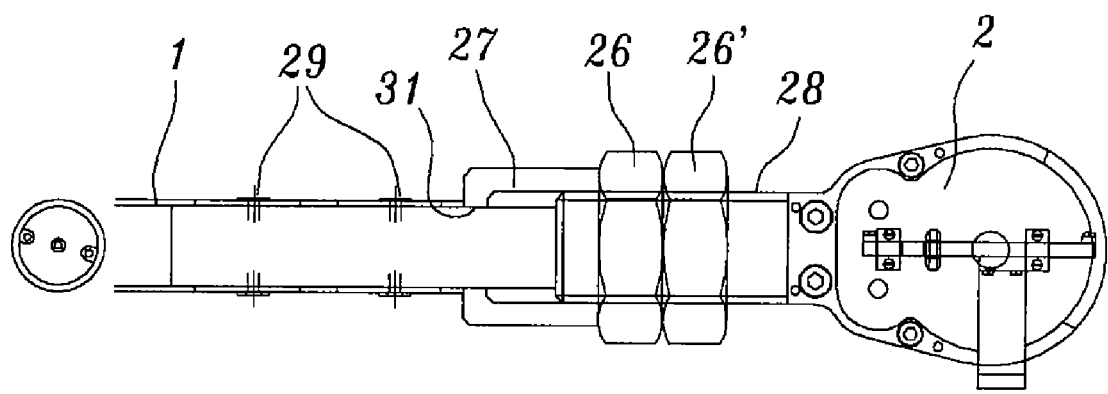

As illustrated in FIGS. 4 and 5, the pivot manipulation cables 23 and 24 are fixed by winding to the first cable drums 21' and 22' of the first pivot member 20 at the first ends thereof on the side of the shielded room, sequentially pass through the first housing 2', bar 1, and second housing 2, and then are fixed by winding to the second cable drums 21 and 22 of the second pivot member 20 at the second ends thereof on the side of the control room. At this time, the pivot manipulation cables 23 and 24 are arranged on the first cable drums 21' and 22' of the first pivot member 20 and the second cable drums 21 and 22 of the second pivot member 20 so as to have different winding directions. Thus, the handle assembly 40 is manipulated to allow bidirectional pivotal motion of the tong assembly 50 while the pivot manipulation cables 23 and 24 take part in unidirectional pivotal motion. Further, in order to prevent the pivot manipulation cables 23 and 24 from obstructing transmission of power in the first and second housings 2' and 2, the first and second housings 2' and 2 are equipped with a pair of idle sheaves 30' and 31' and a pair of idle sheaves 30 and 31, respectively. These idle sheaves guide paths of the pivot manipulation cables 23 and 24 such that the pivot manipulation cables 23 and 24 do not interfere with other components, thereby making the power transmission smooth.

Meanwhile, the fixing ends of the first and second housings 2' and 2 are connected with the first and second ends of the bar 1 on the sides of the shielded and control rooms, are formed in a pipe shape like the bar, and have outer diameters corresponding to inner diameters of the cylindrical spaces of the opposite ends of the bar 1. Thus, the fixing ends of the first and second housings 2' and 2 of the outer joint assembly are coupled with the respective opposite ends of the bar 1 so as to overlap with each other at a predetermined length. Here, the overlapping lengths between the fixing ends of the first and second housings 2' and 2 and the opposite ends of the bar 1 can be varied within a limited range in order to adjust the tensile force of the housed pivot manipulation cables 23 and 24. In this state in which the first and second housings 2' and 2 partially overlap with the bar 1, the first and second housings 2' and 2 can maintain stable connection with the bar 1 by means of fastening bolts 29' and 29 fastened from outer circumferences toward the centers of the cylindrical spaces of the opposite ends of the bar 1. To this end, the first and second housings 2' and 2 are provided with threaded holes (not shown) screwed with the respective fastening bolts 29' and 29, and the cylindrical spaces of the bar 1 are provided with long slots (not shown) formed in a longitudinal direction such that the fastening bolts 29 and 29' can pass through the long slots.

In addition, the second housing 2 of the outer joint assembly has an intermediate part 28 between the fixing end and the free end thereof, wherein the intermediate part 28 has a large diameter and is provided with a thread on an outer circumference thereof. According to an embodiment of the present invention, the joint tong apparatus further includes a support member 27, which is disposed so as to enclose the outer circumference of the second housing 2. The support member 27 is cylindrical and has an inner diameter corresponding to an outer diameter of the intermediate part 28 of the second housing 2, and includes a through-hole having an inner diameter corresponding to an outer diameter of the fixing end of the second housing 2 at a first end thereof facing an end face of the bar 1 on the side of the shielded room. Thus, the first end of the support member 27 located on the side of the shielded room is in contact with the end face of the bar 1 located on the side of the control room, while the second end of the support member 27 located on the side of the control room partially overlaps with the intermediate part 28 of the second housing 2. Further, according to an embodiment of the present invention, the joint tong apparatus includes a tension adjusting nut 26 screwed with the thread formed on the intermediate part 28 of the second housing 2. Alternatively, the joint tong apparatus may further include an anti-loosening nut 26' screwed with the thread formed on the intermediate part 28 of the second housing 2 and disposed along with the tension adjusting nut 26. The tension adjusting nut 26 causes the second housing 2 to be relatively pulled from the bar 1 when screwed toward the shielded room in contact with the end face of the support member 27 on the side of the control room, and thereby increasing the tensile force of the pivot manipulation cables 23 and 24 passing through the inside of the bar 1. Furthermore, the anti-loosening nut 26' is tightened so as to be in close contact with the tension adjusting nut 26, thereby preventing the tension adjusting nut 26 from being loosened.

In this manner, the adjustment of the tensile force of the pivot manipulation cables 23 and 24 using the tension adjusting nut 26 is carried out in the state in which the fastening bolts 29 maintaining the connection between the bar 1 and the second housing 2 are slightly loosened. The tension adjusting nut 26, which is in contact with the support member 27, is screwed, so that the second housing 2 is pulled from the bar 1. Thereby, the pivot manipulation cables 23 and 24 have proper tensile force. In this state, the anti-loosening nut 26' is screwed so as to be in close contact with the tension adjusting nut 26. Finally, the fastening bolts 29, which have been loosened, are screwed again.

As described above, the joint tong apparatus includes the inner and outer joint assemblies, and the pivot manipulation cables transmitting power via the connection with the inner and outer joint assemblies, so that the tong assembly 50 coupled to the inner joint assembly can be pivoted around the first pivot member 20' in the opposite direction when the handle assembly 40 coupled to the outer joint assembly is pivoted around the second pivot member 20.

According to an embodiment of the present invention, as illustrated in FIG. 2, the joint tong apparatus further includes a boot assembly, which includes an anti-contamination boot 9, one end of which is airtightly fixed to the outer circumference of a part where the tong assembly 50 is connected with the first connecting rod of the first pivot member 20', and a boot fixing plate 10, which is mounted on a shielded roomside wall of the partition 6 formed between the radiation-shielded room and the control room and to which the other end of the anti-contamination boot 9 is airtightly fixed. Thus, the boot assembly can prevent the radiation of the inside of the radiation-shielded room from contaminating the control room where a worker is located through the gap between the through-hole 8a of the spherical ball 8 and the bar 1.

As described above, according to an embodiment of the present invention, the joint tong apparatus for a radiation shielding facility can carry out various motions such as the rotational motion of the spherical ball 8, the longitudinal and rotational motions of the bar 1, the pivotal motion of the tong assembly 50, and the opening/closing motion of the tong 5. Each motion can be limited through a separate locking means as needed.

First, as illustrated in FIG. 8, means for locking the spherical ball 8 is provided in order to limit the rotational motion of the spherical ball 8. This spherical ball locking means includes cam members 43 selectively pressing the outer spherical socket 7' toward the inner spherical socket 7 during rotation, cam manipulation levers 45 integrated with the cam members 43, and cam supports 42 coupled to the top of the outer spherical socket 7' contacting the cam members 43. This spherical ball locking means rotates the cam manipulation levers 45 so as to cause the cam members 43 to press the cam supports 42, so that the outer spherical socket 7' comes into close contact with the inner spherical socket 7 while being guided by the guide bolts 49. Thereby, the spherical ball locking means constrains the rotational motion of the spherical ball 8. In order to make smooth the relative motion of the outer spherical socket 7' with respect to the inner spherical socket 7, a bush 49' can be installed between an outer circumference of each guide bolt 49 and an inner circumference of each bolt hole through which each guide bolt 49 of the outer spherical socket 7' passes.

As described above, the bar 1 can not only move in the through-hole 8a of the spherical ball 8 in a longitudinal direction but also be rotated around the central axis of through-hole 8a of the spherical ball 8. However, the longitudinal and rotational motions of the bar 1 can also be limited as needed. To this end, means for locking the bar 1 is mounted so as to be inserted into the through-hole 8a of the spherical ball 8, and thus the through-hole 8a of the spherical ball 8 is also formed so as to interact with the bar locking means.

Figure 9A:
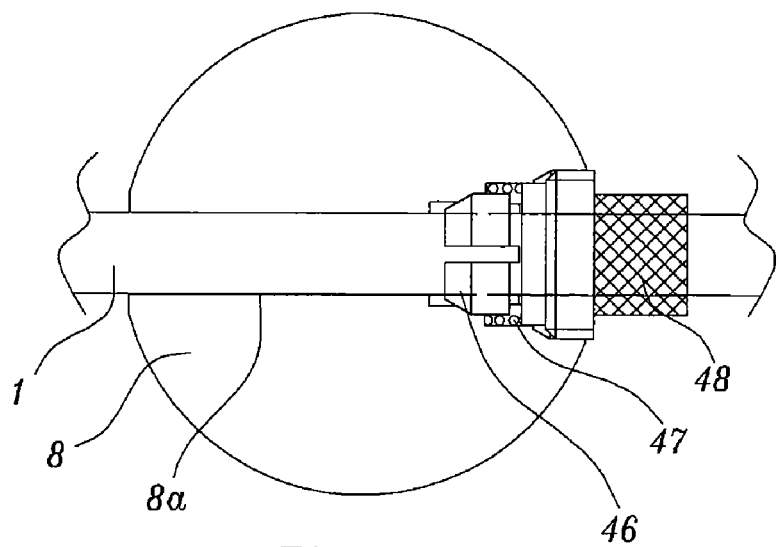
FIG. 9A illustrates connection of a spherical ball and a bar locking means.
Figure 9B:
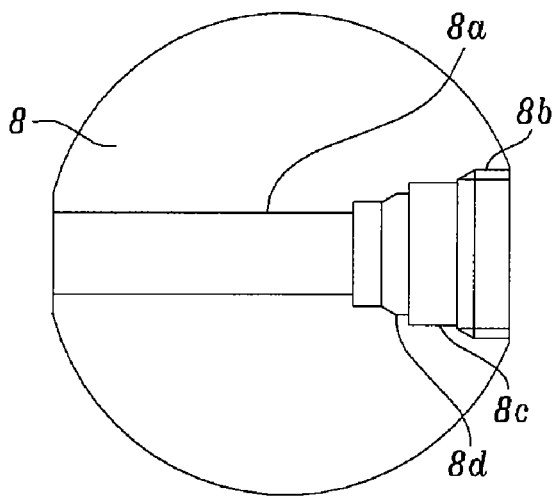
FIG. 9B illustrates the internal structure of a spherical ball.
Figure 10:
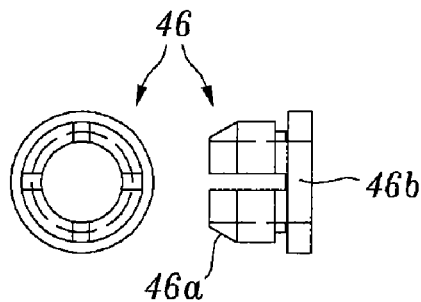
FIG. 10 conceptually illustrates a collet constituting a bar locking means when viewed from the front and side.
Figure 11:
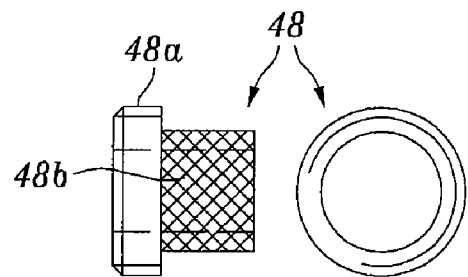
FIG. 11 conceptually illustrates an adjusting bolt for a collet constituting a bar locking means when viewed from the front and side.

In detail, as illustrated in FIGS. 9 through 11, a bar locking means holder, a diameter of which is varied in a multistep manner, is installed adjacent to a control room-side entrance of the through-hole 8a of the spherical ball 8. Specifically, the bar locking means holder is divided into a threaded bolt holder 8b, a spring holder 8c, and a collet guide 8d, which are sequentially installed starting from the control room-side entrance of the through-hole 8a of the spherical ball 8, and diameters of which are step by step reduced toward the inside of the through-hole 8a of the spherical ball 8. Further, the collet guide 8d is partially formed in a shape where its diameter is gradually reduced like a funnel, so that it can guide the taper part 46a of a collet 46, which will be described below.

The bar locking means includes the collet 46, a restoring spring 47, and an adjusting bolt 48, all of which are located around the bar 1. In detail, the collet 46 is disposed so as to interact with the collet guide 8d located on the innermost side of the bar locking means holder, and includes the taper part 46a, a diameter of which can be elastically varied within a predetermined range, on an inner side thereof, and a spring presser 47b having a relatively great diameter on an outer side thereof. The restoring spring 47 is disposed between an outer circumference of the taper part 46a of the collet 46 and the spring holder 8c, and is in contact with the spring presser 46b of the collet 46 at an outer end thereof. Further, the adjusting bolt 48 has a hollow shape, is located around the bar 1 as described above, and includes an adjusting screw head 48a having a male thread on an outer circumference thereof and a handle 48b so as to be engaged with the bolt holder 8b through the adjusting screw head 48a.

As for this bar locking means, when screwed, the adjusting bolt 48 pushes the spring presser 46b of the collet 46 in an inward direction. In the process of advancing inwards, the taper part 46a of the collet 46 is guided by the collet guide 8d, and thus undergoes reduction in its diameter. Thereby, the taper part 46a of the collet 46 presses the outer circumference of the bar 1, thus firmly fixing the bar 1 in the spherical ball 8. The bar 1 is fixed by the bar locking means, so that the longitudinal and rotational motions of the bar 1 can be constrained in the through-hole 8a of the spherical ball 8. Afterwards, if the longitudinal and rotational motions of the bar 1 are required, the adjusting bolt 48 is simply loosened, so that the restoring spring 47 pushes the spring presser 46b of the collet 46 in an outward direction, thereby retreating the collet 46. In this process, the taper part 46a of the collet 46 is elastically expanded in its diameter, and thus releases the pressing of the outer circumference of the bar 1. As a result, the longitudinal motion (the direction of arrow A of FIG. 2) and the rotational motions (the direction of arrow B of FIG. 2) of the bar 1 can be freely made.

Further, the pivotal motion of the tong assembly 50 is also to be limited as needed. The pivotal motion of the tong assembly 50 is not made through the handle assembly 40 by constraining the second pivot member 20 from being pivoted. To this end, means for locking the pivotal motion of the tong assembly 50 is provided.

Figure 12A:
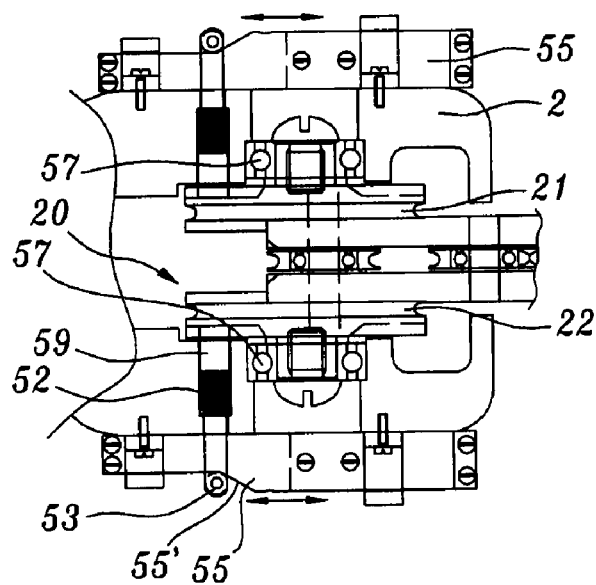
FIGS. 12A through 12C conceptually illustrate a tong assembly pivotal motion locking structure for limiting pivotal motion of the tong assembly of an inner joint assembly.
Figure 12B:
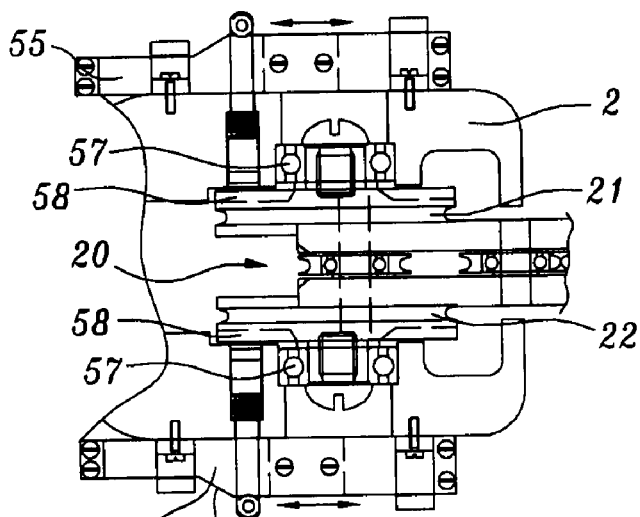
Figure 12C:
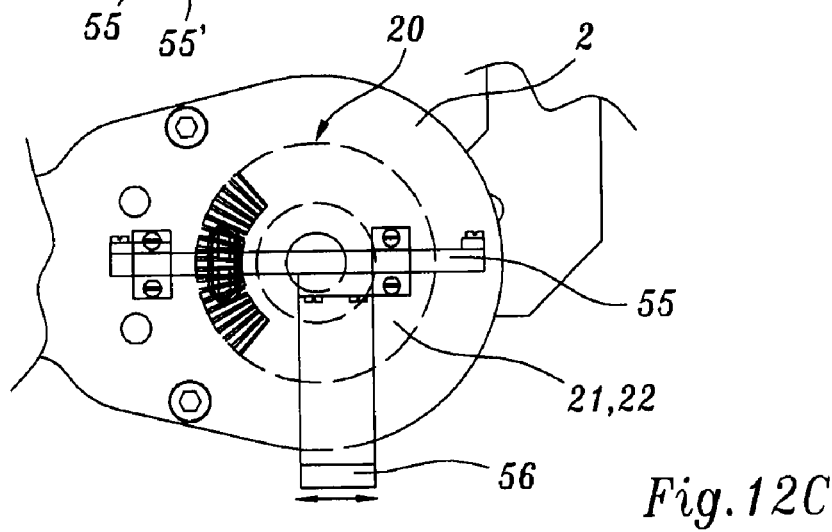
Figure 13A:
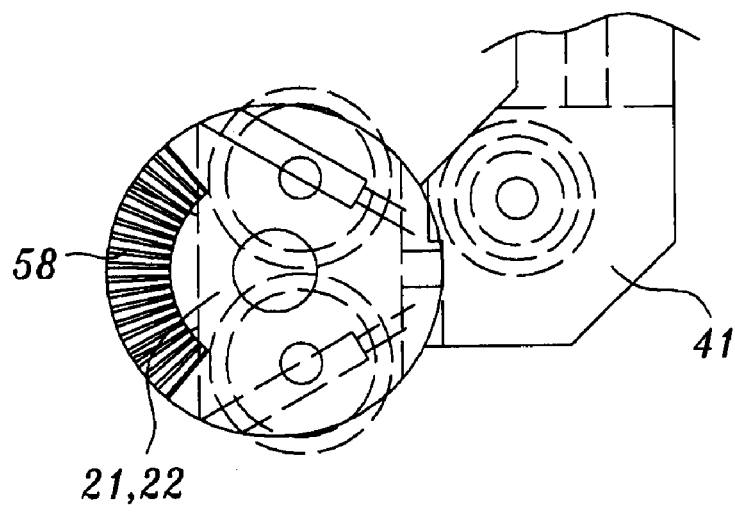
FIGS. 13A through 13C conceptually illustrate structures of components constituting the tong assembly pivotal motion locking structure of FIG. 12.
Figure 13B:
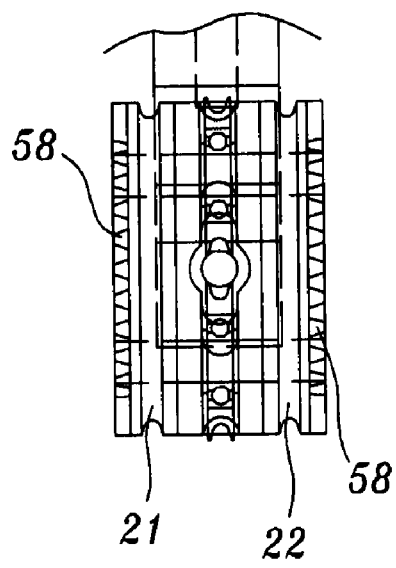
Figure 13C:
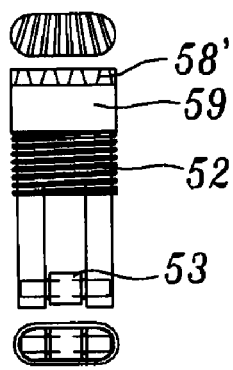

As illustrated in FIGS. 12 and 13, the tong assembly pivotal motion locking means includes a pair of stoppers 59, a pair of linear motion cams 55, and a cam lever 56.

In detail, the stoppers 59 includes a plurality of constraint protrusions 58' on inner ends thereof facing sides of the respective cable drums 21 and 22, and guide rollers 53 mounted on outer ends thereof. The stoppers 59 constrain the second pivot member 20 from being pivoted in such a manner that they are housed in a pair of stopper guide holes passing through opposite sides of the second housing 2 at positions where they face the sides of the respective cable drums 21 and 22 parallel to a pivotal axis of the second pivot member 20 together with the compressive springs 52. The linear motion cams 55 are mounted on the opposite sides of the second housing 2, and move back and forth within a predetermined range. Further, the linear motion cams 55 have inclined faces on which the guide rollers 53 of the stoppers 59 are guided when moving back and forth, thereby serving to push or pull the stoppers 59 configured to press or release the sides of the cable drums 21 and 22. Further, the cam lever 56 is integrally formed with the pair of linear motion cams 55, thereby allowing the linear motion cams 55 to be manipulated in forward and backward directions at the same time.

Furthermore, the cable drums 21 and 22 each include a plurality of constraint grooves 58 on the sides thereof contacting the constraint protrusions 58' of the respective stoppers 59 so as to be engaged with the constraint protrusions 58' of the respective stoppers 59, so that they can provide stable constraining force when pressed by the stoppers 59. In this manner, when the second pivot member 20 cannot be pivoted due to the stoppers 59, the handle assembly 40 cannot be pivoted in spite of the application of external force, and thus the pivotal motion of the tong assembly 50 is limited. As a result, the tong assembly 50 maintains a fixed state.

For reference, the state in which the cable drums 21 and 22 are constrained by the stoppers 59 is illustrated in FIG. 12A. The state in which the cable drums 21 and 22 are not constrained by the stoppers 59 and thus the second pivot member 20 can be freely pivoted is illustrated in FIG. 12B. FIG. 12C is a side view conceptually illustrating the structure in which a tong assembly pivotal motion locking means is installed.

Furthermore, as illustrated in FIG. 14, the handle assembly 40 further includes a tong locking means so as to be able to keep the tong 5 closed in such a manner that the handle lever 4 connected with the tong manipulation cable 11 is limited to its pivotal motion.

The tong locking means includes a ratchet 15, a pawl 14, and a ratchet manipulation lever 13. In detail, the ratchet 15 is integrally coupled to the handle lever 4 so as to be located adjacent to a hinge for coupling the handle 3 with the handle lever 4, and has a ratchet wheel 15' with a plurality of teeth. The pawl 14 is mounted on the handle 3 through the hinge so as to be located adjacent to the ratchet 15, and has a constraint protrusion 14' engaged with the ratchet wheel 15' of the ratchet 15. However, this constraint protrusion 14' constrains the ratchet wheel 15' of the ratchet 15 in one direction only but not in the other direction. Thus, when the handle lever 4 connected with the tong manipulation cable 11 is pulled in order to allow the tong 5 to be closed, the ratchet 15 is not constrained by the pawl 14, and thus does not limit the pivotal motion of the handle lever 4. However, the ratchet 15 is constrained by the pawl 14 in the opposite direction, and thus the handle lever 4 is kept pulled without being restored although external force is not separately applied. Further, the ratchet manipulation lever 13 includes a cam part and a lever part, and is mounted on the handle 3 so as to be located adjacent to the pawl 14. This ratchet manipulation lever 13 interacts with the pawl 14 in such a manner that the pawl 14 is pivoted around the hinge when the cam part thereof presses part of the pawl 14 by means of manipulation of the lever part thereof. Thereby, the ratchet manipulation lever 13 allows the ratchet 15 to be constrained by the pawl 14 or to be released from the constraint caused by the pawl 14.

Of course, in the case in which the ratchet manipulation lever 13 is manipulated to cause the pawl 14 to release the constraint of the ratchet 15, the handle lever 4 can be freely pivoted in opposite directions. Thus, when the handle lever 4 is pulled, the tong manipulation cable 11 is pulled, and thereby the tong 5 is closed. In contrast, when the handle lever 4 is released, the tong 5 becomes open by means of the restoring spring 12 constituting the tong assembly 50.

To the contrary, in the case in which the ratchet manipulation lever 13 is manipulated to cause the pawl 14 to constrain the ratchet 15, the pivotal motion of the handle lever 4 is restrictively allowed. In detail, when the handle lever 4 is pulled, the tong 5 is closed. At this time, although the external force applied to the handle lever 4 is removed, the handle lever 4 is kept pulled without restoration. Thus, the tong 5 is also kept closed. In this state, if it is necessary to open the tong 5, the ratchet manipulation lever 13 has to be manipulated to cause the pawl 14 to release the constraint of the ratchet 15. For example, if it is necessary to use the tong 5 to grasp radioactive material, this grasp is carried out in the state in which any worker manipulates the ratchet manipulation lever 13 to cause the pawl 14 to constrain the ratchet 15, so that the radioactive material can be stably fixed to the tong 5 only if the handle lever 4 is pulled. In contrast, if it is necessary to release the radioactive material, this release is carried out in the state in which the worker simply manipulates the ratchet manipulation lever 13 to cause the pawl 14 to release the constraint of the ratchet 15.

As described above, since the joint tong apparatus has the tong locking means, it is unnecessary to continue to pull the hand lever 4 when the very dangerous radioactive material is being handled by the tong 5, so that safety as well as convenience of the handling can be remarkably improved.

Now, the operation of the joint tong apparatus for a radiation shielding facility will be described below in detail.

First, the spherical ball 8 can freely make rotational motion without separation by means of the inner and outer spherical sockets 7 and 7' installed in the partition 6 between the shielded room and the control room. This rotational motion of the spherical ball 8 can be limited by the outer spherical socket 7' that is brought into close contact with the inner spherical socket 7 by the spherical ball locking means as described above.

The bar 1 can freely make longitudinal motion in the through-hole 8a passing through the spherical ball 8, as well as rotational motion with respect to the central axis of the through-hole 8a. The longitudinal motion (the direction of arrow A of FIG. 2) and the rotational motion (the direction of arrow B of FIG. 2) of the bar 1 can be limited by the bar locking means as described above.

Figure 6:
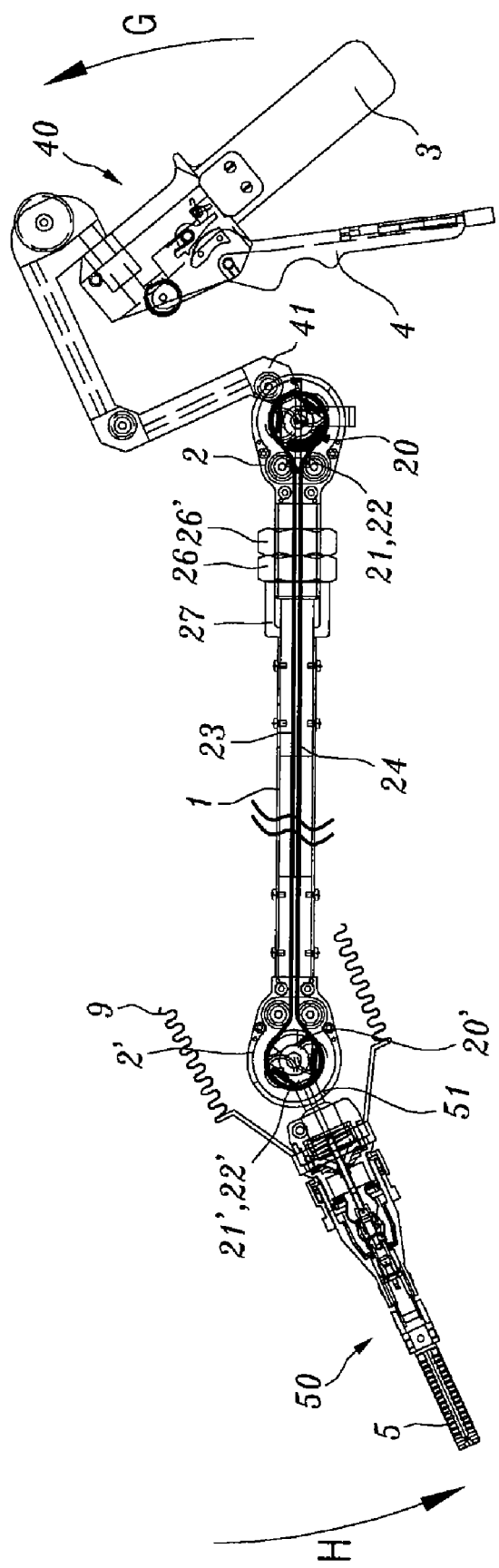
FIG. 6 conceptually illustrates the direction of a pivotal motion of a tong assembly when a handle assembly is rotated in a counterclockwise direction.
Figure 7:
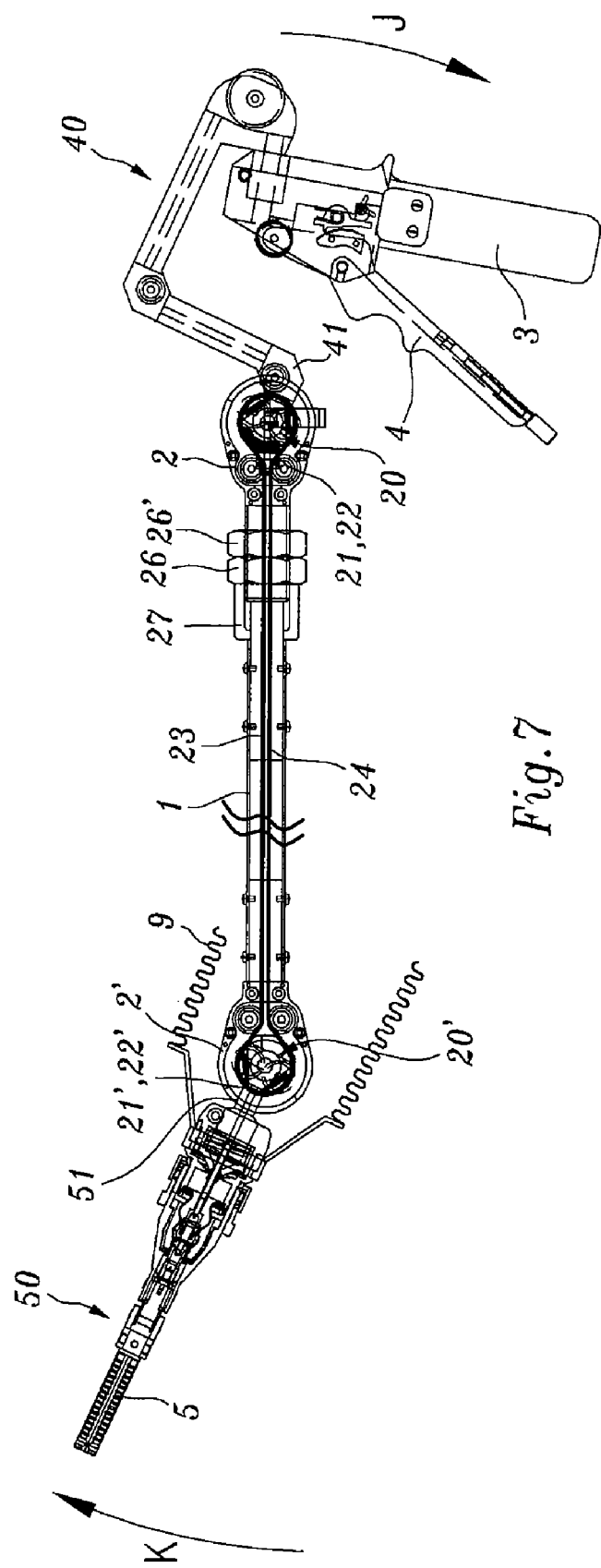
FIG. 7 conceptually illustrates the direction of pivotal motion of a tong assembly when a handle assembly is rotated in a clockwise direction.

Further, as illustrated in FIGS. 6 and 7, the tong assembly 50 is manipulated such that the handle assembly 40 is pivoted around the second pivot member 20 of the outer joint assembly in opposite directions (of arrow G of FIG. 6 and arrow J of FIG. 7). Thereby, the tong assembly 50 can be pivoted around the first pivot member 20' of the inner joint assembly in opposite directions (of arrow H of FIG. 6 and arrow K of FIG. 7). This pivotal motion of the tong assembly 50 can be limited by constraining the second pivot member 20 from being pivoted by the tong assembly pivotal motion locking means as described above.

In addition, the tong 5 is closed by basically pulling the handle lever 4, and is opened by the restoring spring 12 by removing the external force applied to the handle lever 4. However, alternatively, the tong 5 may be kept closed by the tong locking means, although the external force applied to the handle lever 4 is removed after the handle lever 4 is pulled.

As described above, according to an embodiment of the present invention, the joint tong apparatus for a radiation shielding facility can carry out various motions, each of which can be selectively limited as needed. Thus, the joint tong apparatus provides remarkably improved safety and convenience when the radioactive material is handled in the radiation shielding facility.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A joint tong apparatus for a radiation shielding facility comprising:
    a spherical ball having a through-hole passing therethrough;
    a spherical socket set having an inner spherical socket and an outer spherical socket, which are formed so as to correspond to an outer surface of the spherical ball, the spherical socket set is configured to be installed in a hole formed in a partition between a radiation-shielded room and a control room so as to enclose the spherical ball on inner and outer sides;
    a bar inserted and coupled into and to the through-hole of the spherical ball, and including three cable through-holes passing through an inside of the bar in parallel in a longitudinal direction;
    an inner joint assembly having a first housing coupled to a first end of the bar on the side of the shielded room and a first pivot member mounted on a free end of the first housing so as to be able to be pivoted within a predetermined angle;
    an outer joint assembly having a second housing coupled to a second end of the bar on the side of the control room and a second pivot member mounted on a free end of the second housing so as to be able to be pivoted within a predetermined angle;
    a tong assembly including a tong for grasping an object and a restoring spring for keeping the tong open at ordinary times, and coupled to the inner joint assembly through the first pivot member;
    a handle assembly including a handle and a handle lever, and coupled to the outer joint assembly through the second pivot member;
    a tong manipulation cable connected to the tong at a first end of the cable on the side of the shielded room, and sequentially passing through the inner joint assembly, bar, and outer joint assembly, connected to the handle lever at a second end of the cable on the side of the control room, and closing the tong when the handle lever is manipulated; and
    a pair of pivot manipulation cables fixed by winding to the first pivot member at first ends thereof on the side of the shielded room, sequentially passing through the first housing, bar, and second housing, fixed by winding to the second pivot member at second ends thereof on the side of the control room, wound around the first and second pivot members in different directions, and enabling the tong assembly to be pivoted in opposite directions by means of manipulation of the handle assembly,
    wherein the inner spherical socket and the outer spherical socket are coupled with each other by guide bolts, and are configured to be spaced apart from each other by a constant distance by means of restoring springs.

2. The joint tong apparatus according to claim 1, further comprising a spherical ball locking means, which includes cam members selectively pressing the outer spherical socket toward the inner spherical socket during rotation, cam manipulation levers integrated with the cam members, and cam supports coupled to a top of the outer spherical socket contacting the cam members, wherein the spherical ball locking means constrains rotational motion of the spherical ball in such a manner that the outer spherical socket comes into close contact with the inner spherical socket.

3. The joint tong apparatus according to claim 1, further comprising:

a bar locking means holder, which is installed in the through-hole of the spherical ball and includes a threaded bolt holder, a spring holder, and a collet guide, diameters of the threaded bolt holder, the spring holder, and the collet guide are step by step reduced starting from a control room-side entrance of the through-hole of the spherical ball, the collet guide having a diameter gradually reduced in part; and a bar locking means, which includes: a collet having a taper part, a diameter of which is elastically varied within a predetermined range, on an inner side thereof, and a spring presser having a relatively greater diameter on an outer side thereof; a restoring spring disposed between the spring holder and an outer circumference of the taper part of the collet and the spring holder, and the restoring spring being in contact with the spring presser of the collet at an outer end of the restoring spring; and a hollow adjusting bolt threaded on an outer circumference thereof and engaged with the bolt holder;

wherein the bar locking means limits longitudinal and rotational motions of the bar with respect to the spherical ball in such a manner that, while the adjusting bolt is screwed to advance the collet in an inward direction, the diameter of the taper part is reduced to have the collet guide press the outer circumference of the bar.

4. The joint tong apparatus according to claim 1, further comprising a tong locking means, which includes:

a ratchet integrally coupled to the handle lever and having a ratchet wheel with a plurality of teeth;

a pawl mounted on the handle through a hinge so as to be located adjacent to the ratchet, and having a constraint protrusion engaged with the ratchet wheel of the ratchet; and a ratchet manipulation lever having a cam part and a lever part, mounted on the handle so as to be located adjacent to the pawl, and allowing the ratchet to be constrained by the pawl or to be released from the constraint caused by the pawl in such a manner that the pawl is pivoted around the hinge when the cam part of the ratchet manipulation lever partially presses the pawl by means of manipulation of the lever part thereof.

5. The joint tong apparatus according to claim 4, wherein the constraint protrusion of the pawl and the ratchet wheel of the ratchet are shaped so as to limit only pivotal motion in a direction where the handle lever is restored.

6. The joint tong apparatus according to claim 5, further comprising an adjustment knob, which is mounted on a lower end of the handle lever and adjusts a length of the tong manipulation cable.

7. The joint tong apparatus according to one of claim 1, or 2 through 6, wherein:

the first pivot member includes a first connecting rod protruding from a center thereof in a radial direction and coupled with the tong assembly, and a pair of first cable drums which are integrally coupled to opposite sides of the first connecting rod and to which shielded room-side ends of the pivot manipulation cables are fixed by winding; and the second pivot member includes a second connecting rod protruding from a center thereof in a radial direction and coupled with the handle assembly, and a pair of second cable drums which are integrally coupled to opposite sides of the second connecting rod and to which control room-side ends of the pivot manipulation cables are fixed by winding.

8. The joint tong apparatus according to claim 7, further comprising a tong assembly pivotal motion locking means, which includes:

a pair of stoppers having guide rollers mounted on outer ends thereof, housed together with compressive springs in a pair of stopper guide holes passing through opposite sides of the second housing at positions where the stoppers face the sides of the respective cable drums parallel to a pivotal axis of the second pivot member, and constraining the second pivot member from being pivoted in such a manner that the stoppers laterally press the cable drums through inner ends thereof facing the sides of the cable drums using elastic force of the compressive springs;

a pair of linear motion cams mounted on the respective opposite sides of the second housing, moving back and forth within a predetermined range, having inclined faces on which the guide rollers of the stoppers are guided when the linear motion cams moving back and forth, and serving to push or pull the stoppers configured to press or release the sides of the cable drums; and a cam lever integrally formed with the linear motion cams such that the linear motion cams are manipulated in forward and backward directions at the same time.

9. The joint tong apparatus according to claim 8, wherein:

the stoppers each include a plurality of constraint protrusions on the inner ends thereof facing the sides of each cable drum; and the cable drums of the second pivot member each include a plurality of constraint grooves on sides thereof contacting the constraint protrusions of the respective stoppers so as to be engaged with the constraint protrusions of the respective stoppers, and provide stable constraining force when pressed by the stoppers.

10. The joint tong apparatus according to claim 9, wherein the first and second housings each include a pair of idle sheaves mounted therein and guiding paths of the pivot manipulation cables such that the pivot manipulation cables do not interfere with other components.

11. The joint tong apparatus according to claim 10, wherein:

the first and second housings have fixing ends connected with the first and second ends of the bar on the sides of the shielded and control rooms and are coupled with the opposite ends of the bar in such a manner that the fixing ends thereof overlap with each other at a predetermined length inside the opposite ends of the bar;

the overlapping lengths between the fixing ends of the first and second housing and the opposite ends of the bar can be varied within a limited range in order to adjust tensile force of the housed pivot manipulation cables; and the first and second housings are fastened from an outer circumference toward a center of the bar by means of at least one fastening bolt in order to maintain connection with the bar.

12. The joint tong apparatus according to claim 11, wherein the second housing includes an intermediate part between the fixing end and the free end thereof, the intermediate part having a large diameter and a threaded outer circumference, and further comprising:

a support member, which is cylinder-shaped and has an inner diameter corresponding to an outer diameter of the intermediate part of the second housing, and includes a through-hole having an inner diameter corresponding to an outer diameter of the fixing end of the second housing at a first end thereof facing an end face of the bar on the side of the shielded room, encloses the outer circumference of the second housing and is disposed such that the first end thereof located on the side of the shielded room is in contact with the end face of the bar located on the side of the control room; and a tension adjusting nut screwed with a thread formed on the intermediate part of the second housing, causing the second housing to be relatively pulled from the bar when screwed toward the shielded room in contact with the end face of the support member on the side of the control room, and adjusting tensile force of the pivot manipulation cables.

13. The joint tong apparatus according to claim 12, further comprising an anti-loosening nut, which is screwed with the thread formed on the intermediate part of the second housing so as to be engaged with the tension adjusting nut, and which prevents the tension adjusting nut from being loosened when screwed so as to remain in close contact with the tension adjusting nut.

14. The joint tong apparatus according to claim 13, further comprising a boot assembly, which includes an anti-contamination boot, one end of which is airtightly fixed to an outer circumference of a part where the tong assembly is connected with the first connecting rod of the first pivot member, and a boot fixing plate, which is mounted on a shielded room-side wall of the partition formed between the radiation-shielded room and the control room such that the other end of the anti-contamination booth is airtightly fixed.

* * * * *

UNITED STATES PATENT AND TRADEMARK OFFICE
CERTIFICATE OF CORRECTION

PATENT NO. : 8,251,628 B2  
APPLICATION NO. : 12/259445  
DATED : August 28, 2012  
INVENTOR(S) : Eun Pyo Lee et al.

Page 1 of 1

It is certified that error appears in the above-identified patent and that said Letters Patent is hereby corrected as shown below:

Column 14, claim 1, line 63, after "springs", insert --, the restoring springs are installed between the inner spherical socket and the outer spherical socket so as to push the outer spherical socket against the inner spherical socket--.

Signed and Sealed this  
Sixth Day of November, 2012

David J. Kappos  
*Director of the United States Patent and Trademark Office*